United States Patent
Gotz et al.

(10) Patent No.: US 9,724,905 B2
(45) Date of Patent: Aug. 8, 2017

(54) HOT GAS GENERATION DEVICE

(71) Applicant: Homag Holzbearbeitungssysteme GmbH, Schopfloch (DE)

(72) Inventors: Reiner Gotz, Horb-Diessen (DE); Johannes Schmid, Starzach-Wachendorf (DE)

(73) Assignee: HOMAG HOLZBEARBEITUNGSSYSTEME GMBH, Schopfloch (DE)

( * ) Notice: Subject to any disclaimer, the term of this patent is extended or adjusted under 35 U.S.C. 154(b) by 604 days.

(21) Appl. No.: 14/267,001

(22) Filed: May 1, 2014

(65) Prior Publication Data

US 2014/0326413 A1  Nov. 6, 2014

(30) Foreign Application Priority Data

May 3, 2013  (DE) .................. 10 2013 208 127

(51) Int. Cl.
| | |
|---|---|
| B32B 37/00 | (2006.01) |
| B32B 38/00 | (2006.01) |
| B27D 5/00 | (2006.01) |
| F24H 3/06 | (2006.01) |
| H05B 3/44 | (2006.01) |
| B32B 37/12 | (2006.01) |
| H05B 6/10 | (2006.01) |

(52) U.S. Cl.
CPC .......... *B32B 38/0036* (2013.01); *B27D 5/003* (2013.01); *B32B 37/1207* (2013.01); *F24H 3/062* (2013.01); *H05B 3/44* (2013.01); *H05B 6/108* (2013.01); *B32B 2310/0454* (2013.01); *H05B 2203/022* (2013.01); *H05B 2203/032* (2013.01); *Y10T 137/6416* (2015.04)

(58) Field of Classification Search
CPC . B32B 38/0036; B32B 37/1207; B27D 5/003; F24H 3/062; H05B 3/44; H05B 6/108
USPC .......................................... 156/82, 497, 499
See application file for complete search history.

(56) References Cited

U.S. PATENT DOCUMENTS

| | | | |
|---|---|---|---|
| 2,491,849 A | 12/1949 | Broome | |
| 2,775,683 A | 12/1956 | Kleist | |
| 4,222,812 A * | 9/1980 | Duewel | B27D 5/003 156/497 |
| 5,441,710 A | 8/1995 | Marois | |
| 5,725,711 A | 3/1998 | Taylor | |
| 6,602,174 B1 | 8/2003 | Haverfield et al. | |
| 2007/0145038 A1 | 6/2007 | Vissa et al. | |
| 2008/0089676 A1 | 4/2008 | Schubert et al. | |
| 2014/0014266 A1 | 1/2014 | Schulte-Goebel | |

FOREIGN PATENT DOCUMENTS

| | | |
|---|---|---|
| DE | 285011 B1 | 4/1980 |
| DE | 4025596 A1 | 2/1992 |
| EP | 0253547 B1 | 1/1992 |
| GB | 1133992 A | 11/1968 |

* cited by examiner

*Primary Examiner* — James Sells
(74) *Attorney, Agent, or Firm* — Scott R. Cox (57) ABSTRACT

A hot gas generation device with which a gas flow, for example, an air flow, is heated. This device is used for heating an edge band or another coating material, in particular an adhesive layer provided on this coating material. In this way, the coating material is prepared for being applied to a (wooden) work piece, which may, for example, be plate-shaped.

31 Claims, 9 Drawing Sheets

HOT GAS GENERATION DEVICE

TECHNICAL FIELD

The present invention relates to a hot gas generation device with which a gas flow, for example an air flow, is heated. This is preferably used for heating an edge band or another coating material, in particular an adhesive layer provided on this coating material. In this way, the coating material is prepared for being applied to a (wooden) work piece, which may, for example, be plate-shaped. Moreover, the present invention is directed at a work piece coating machine, in particular an edge gluing machine, comprising such a hot gas generation device. This concerns machines in the field of CNC and stationary technology, in which a work piece is held fixed during the application of the coating, and also machines in the field of through-feed technology (moving work piece).

STATE OF THE ART

DE 10 2011 015 898 A1 is known as state of the art. This document relates to an edge coating apparatus for applying a strip-shaped, multi-layered edge strip to narrow surfaces of a work piece, the edge strips being attachable to the narrow surfaces without adhesive in an activatable manner. The edge coating apparatus comprises at least one feed device for the edge strips and a press-down device that presses the heat-activated edge strips against the narrow surfaces of the work piece. An outlet for hot air or hot gas is disposed in the region of the feed device and/or the press-down device which applies the hot air or hot gas, under pressure, to the edge strips and/or the heat-activatable layer of the edge strip. A heating device which brings the hot air or hot gas to the required activation temperature for the heat-activatable layer of the edge strip is fluidly connected to the outlet. Heat exchanger elements, such as parallel pipe bundles or sintered material with a heating element embedded therein, for example an electrically operated or gas-operated heating element, are provided in the heating device.

If, however, the variant with the sintered material is used, a relatively high drop in pressure occurs between the inlet of the heat exchanger and the outlet, which is why the system has to be operated at a high volume flow and at a high pressure. This, in turn, leads to a bad reaction to the temperature regulation and the control. Moreover, the heating device has to be designed so as to be relatively large.

THE SUBJECT MATTER OF THE INVENTION

The objective of the present invention is to provide a hot gas generation device with which the problems mentioned above can be eliminated. Furthermore, with such a hot gas generation device the inlet pressure is to be kept relatively low, with activation of a coating material nevertheless being possible.

The subject matter of the independent claim 1 provides a solution for the objectives mentioned above. Further preferred embodiments are described in the dependent claims.

The basic idea of the present invention is to convey the gas into the hot gas generation device such that less of a drop in pressure is to be expected.

Within the meaning of the present invention, "gas" means any gaseous medium such as air.

A hot gas generation device can be disposed immediately before the respective hot gas nozzle, which is configured, for example, as a diverting device, so that very small losses result, or it can be integrated into this nozzle. Moreover, very short heating-up times can be expected. Thus, the hot gas generation device can also be switched on if necessary.

The gas is heated such that a temperature of approximately 300 to 400° C. is reached upon leaving the hot gas generation device. In this way, the secure activation of a coating material, for example an edge band, for adhering to a work piece is achieved.

According to the invention, it is provided that the gas conveyance path runs in the housing about an axis. This configuration of the gas conveyance path allows the hot gas generation device to be designed such that it is extremely compact since the gas conveyance path also makes use of the width of the housing. As explained in the following, the course of the gas conveyance path about an axis is, for example, a coil-shaped, spiral-shaped, helix-shaped or other guideway wound about the axis.

In this respect, it is preferred that the power source is accommodated inside the housing and therefore forms a compact unit with the gas conveyance path. Alternatively, the power source could also be attached to the housing, and in this way can act upon the gas conveyed in the gas conveyance path.

In this connection, the gas conveyance path is preferably guided in a coil-shaped manner in the housing, for example as a fine thread with a very gently inclined pitch, such that a long gas conveyance path length results, i.e. a long thread length in the specific example. Thus, the medium guided through the hot gas generation device can be heated over a relatively long distance despite the compact design of the hot gas generation device.

Alternatively, the gas conveyance path can also run in a spiral-shaped or a helix-shaped manner about the axis, in particular with the same pitch or a changing pitch.

Since the gas is heated in the gas conveyance path, and therefore expands along the direction of flow, it is preferred that the cross section of the gas conveyance path increases along the direction of flow. In this way, the flow rate of the conveyed gas can be held substantially constant. According to an alternative embodiment, the cross section of the gas conveyance path can, however, also be held constant.

A rotational body is preferably accommodated in the housing, on the outer side of which the gas conveyance path runs, and the rotational body is preferably accommodated in an insulation pipe. Such a construction is particularly cost-effective to produce. Here, the axis mentioned above is preferably the longitudinal axis of the rotational body.

Alternatively, a rotational body is accommodated in the housing, the gas conveyance path being guided inside the rotational body. Thus, a compact assembly comprising few individual elements is provided. The axis mentioned above may be a longitudinal axis of the rotational body also in this case.

In a preferred embodiment, the power source is accommodated in the rotational body. Alternatively, provision may also be made for the rotational body itself to be heated.

In particular, according to one embodiment the power source is a resistance heater cartridge. This is particularly easy to integrate into the housing or, according to one of the variants above, into the rotational body.

According to a further variant of the present invention, a plurality of housings can be connected in parallel or in series. It is therefore possible to provide either a plurality of parallel gas conveyance paths or to heat up the medium conveyed in a gas conveyance path more intensely when there is a plurality of housings connected in series.

Furthermore, it is preferable that a diverting device having at least one outlet opening be provided in the direction of flow toward the housing. This is provided in order to guide the gas flow conveyed in the gas conveyance path onto an edge band, for example. In this way, the edge band itself, or an adhesive layer provided thereon, is put into an activated state so that the edge band can be adhered to a narrow side of a work piece.

In this respect it is preferably provided that the heated gas is guided from the housing to at least one outlet opening, and in this way the direction of flow undergoes a diversion.

Alternatively, however, the housing can be integrated into the diverting device such that the heated gas exiting the housing also immediately exits the outlet opening of the diverting device, or such that the housing is disposed so as to be directly adjacent to the diverting device.

Moreover, the direction of flow of the heated gas having exited the housing can be guided in a straight line to the at least one diverting device and can also exit this in a straight line.

However, in principle it is also possible with a further embodiment of the present invention to provide a coating of the broadside of a work piece.

The outlet opening may have a plurality of geometries; it may, for example, be round, square, slit-shaped, in the shape of a free form or—in the case of a plurality of outlet openings—have different cross sections. Moreover, a plurality of openings may be arranged in a row, or the outlet opening may be formed as a slit in order to form a 'row' in this way.

Furthermore, it is possible to arrange a plurality of such rows such that they are adjacent to one another, with each row being formed individually, and, optionally, these rows can be supplied with a gas flow from the housing individually or all together.

Preferably, the diverting device is provided with a first suction device adjacent to the outlet openings and pointing essentially in the same direction. The gas extracted by the suction device can be guided back to the housing and can in turn be used to heat the newly supplied gas. In this way, the energy efficiency of the hot gas generation device can be further increased, with the arrangement described above allowing a compact construction.

Alternatively or in addition, a second suction device is provided opposite the diverting device. This can also be part of the diverting device itself. Thus, particularly in the event that no edge band is conveyed along the diverting device, the gas emitted through the outlet opening(s) is extracted in order to keep heat loss to a minimum.

DETAILED DESCRIPTION OF THE PREFERRED EMBODIMENTS

In the following, preferred embodiments of the present invention are described with the help of the enclosed drawings. Further modifications of individual features mentioned in this connection may be combined with one another in order to form new preferred embodiments of the present invention.

Figure 1:
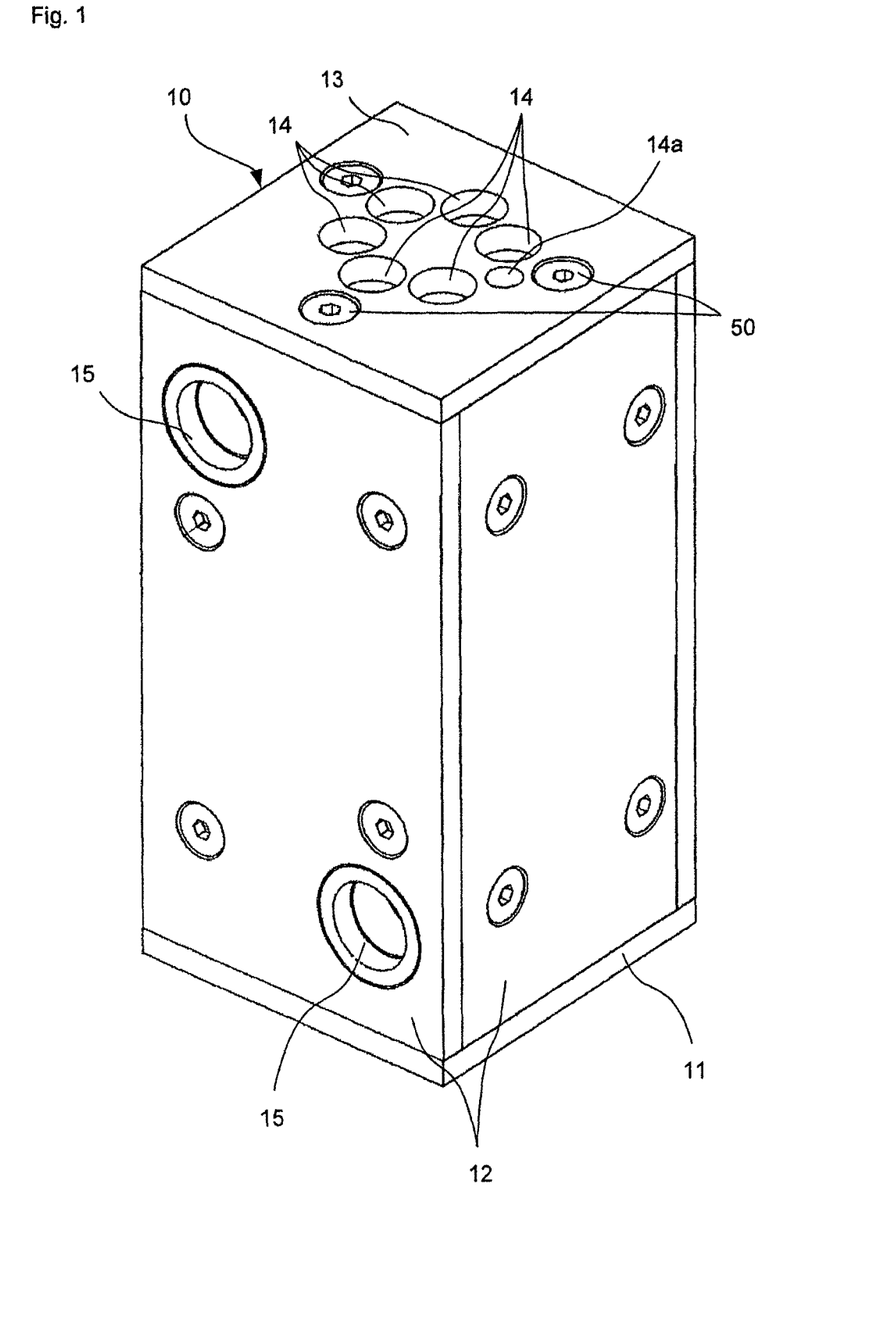
FIG. 1 is a perspective view of a hot gas generation device according to a first embodiment of the present invention.
Figure 2:
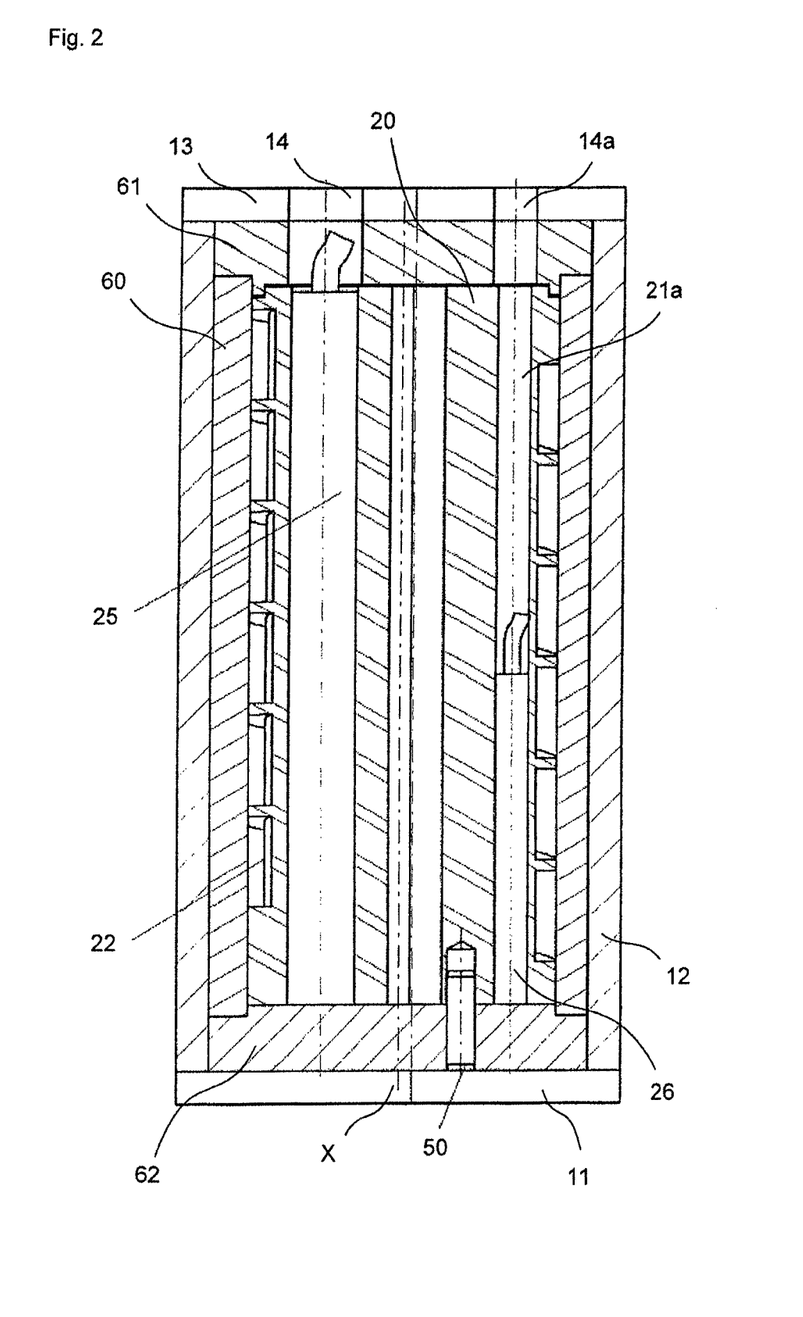
FIG. 2 is a sectional view of the embodiment shown in FIG. 1.

A first embodiment of the present invention relates to a hot gas generation device 1 comprising a housing 10. In the present embodiment, the housing 10 is formed in a plurality of parts and comprises a base portion 11, a plurality of side walls 12 and a cover portion 13. A plurality of openings 14, 14*a* are provided in the region of the cover portion 13 and one or plural side walls have an inlet opening and an outlet opening 15.

Figure 3:
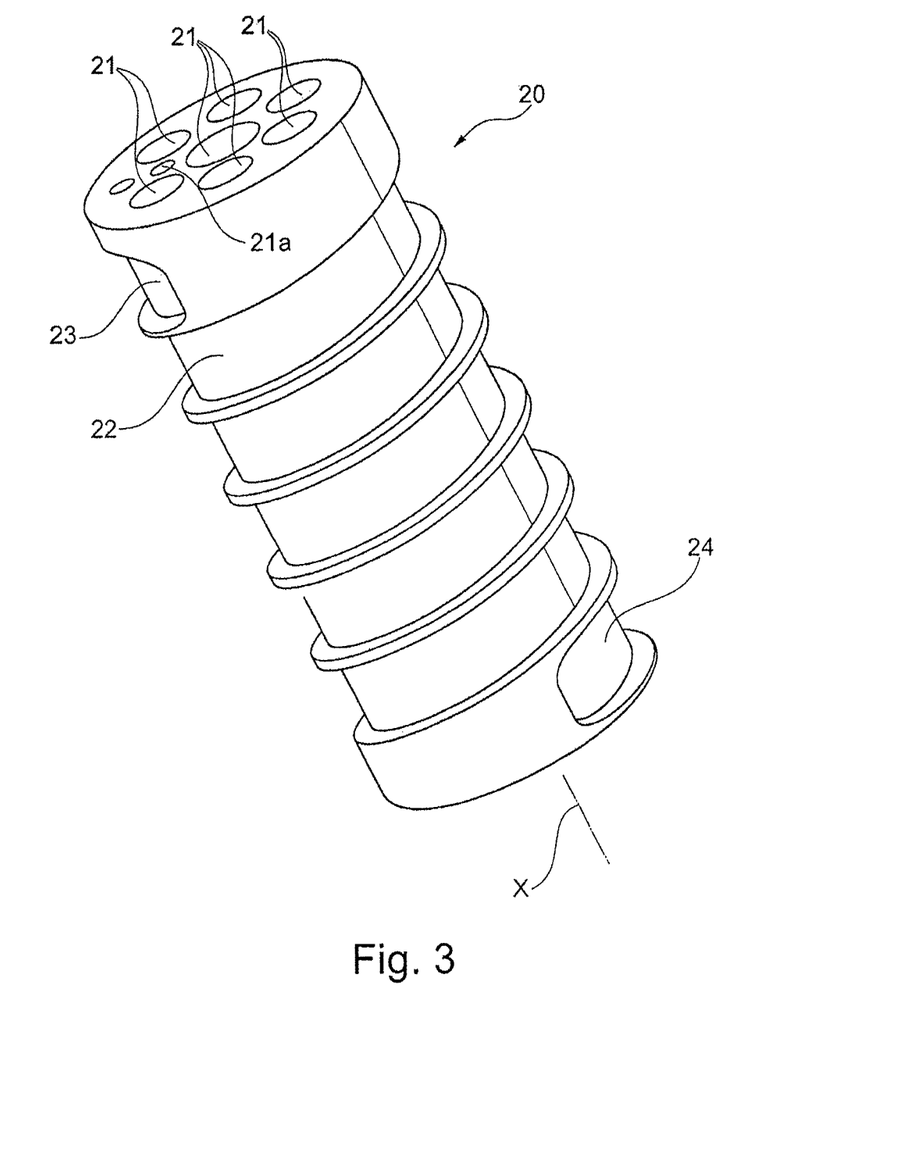
FIG. 3 shows a rotational body accommodated in the embodiment shown in FIG. 1.

A rotational body 20 is accommodated inside the housing 10, which is fixed by means of screws 50 guided though the base portion 11 and the cover portion 13. Moreover, the rotational body 20 comprises a plurality of through holes 21 which in the arrangement of the rotational body 20 in the housing 10 are arranged so as to be complementary to the openings 14 in the cover portion 13. An air conveyance path 22 is arranged in a spiral-shaped manner on the outer circumferential surface of the rotational body 20 and extends from an inlet portion 23 on one side of the rotational body 20 to an outlet portion 24 on the opposite side of the rotational body 20.

In this embodiment, resistance heater cartridges 25 are inserted into the through holes 21. Alternatively, it is possible to insert only one resistance heater cartridge 25 into the rotational body 20 or to heat the rotational body 20 directly.

Moreover, a temperature sensor 26 is accommodated in the rotational body 20, which is used to control the activation of the resistance heater cartridge or cartridges 25. The temperature sensor is inserted through the opening 14*a* in the recess 21*a* of the rotational body 20.

According to this embodiment, an insulation pipe 60 is accommodated inside the housing 10, which extends substantially over the length of the rotational body 20 and therefore outwardly seals off the air conveyance path 22 in a radial direction. Furthermore, an insulating cover 61 is provided on an internal side of the cover portion 13, and a base portion insulating cover 62 is provided on an internal side of the base portion 11.

Figure 4:
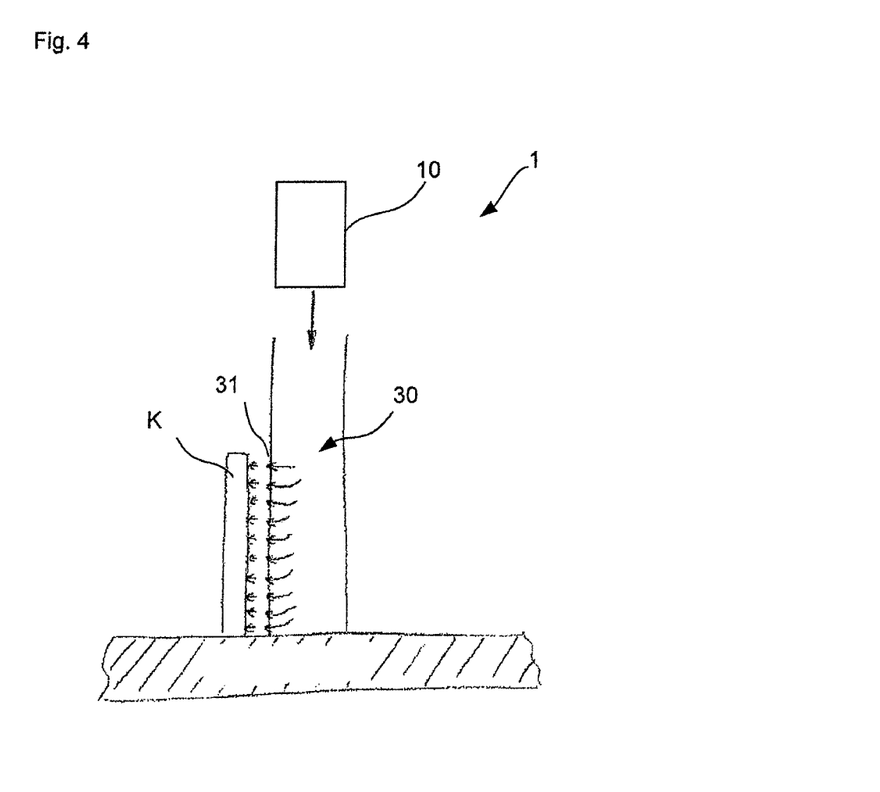
FIG. 4 is a schematic diagram of the hot gas generation device for applying the hot gas to a coating material.

A diverting device 30 is subsequently provided in the direction of flow of the pressurized air conveyed into the housing 10. This diverting device 30 uses the power supplied via the hot air, and transports this in the direction of an edge band K. The hot air or hot gas exits the diverting device 30 in this way and guides the power produced via the carrier medium to activate the edge band K. The diverting device 30 comprises one or plural outlet openings 31. In FIG. 4, a row of a plurality of outlet openings 31 is shown in a side view.

Figure 5:
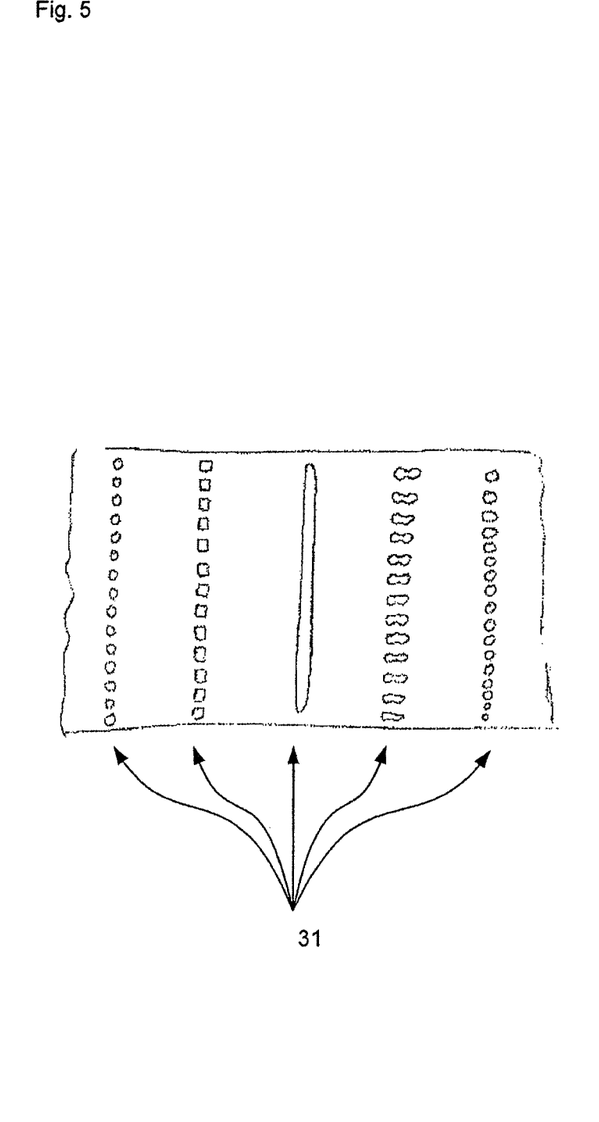
FIG. 5 shows a plurality of variants in the region of a diverting device of the hot gas generation device.

The embodiment of the at least one outlet opening can be versatile. In particular, hole geometries arranged in rows may be provided, with the outlet openings in this case having a round hole geometry, a square-shaped hole geometry, a free-form geometry or a (spiral-shaped) geometry formed along the surface of the outlet openings formed in the fluid direction. Moreover, provision may also be made for a through opening, in particular in the form of a slit (cf. FIG. 5).

Figure 6:
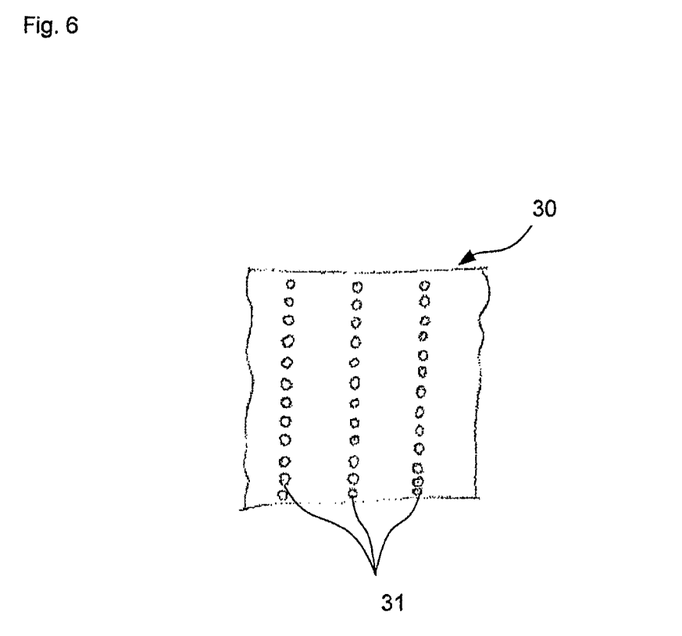
FIG. 6 shows an arrangement having a plurality of rows in the region of the diverting device.
Figure 7:
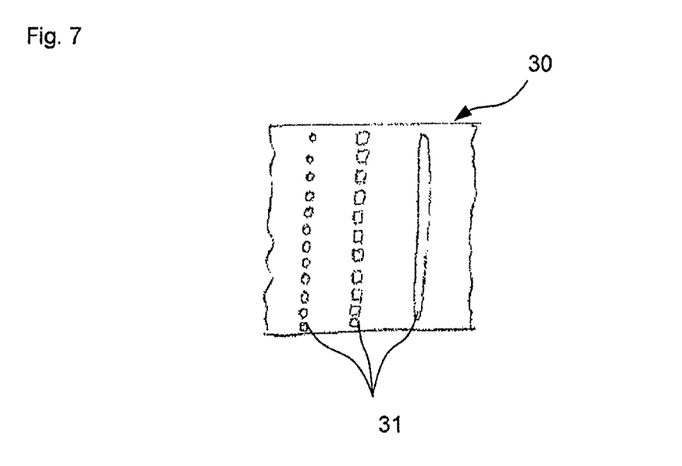
FIG. 7 shows a combined arrangement having a plurality of rows in the region of the diverting device.

According to a preferred embodiment of the present invention, an arrangement of the at least one outlet opening 31 in a plurality of rows is provided, the outlet openings being able to be formed similarly in a plurality of rows, or may comprise one or plural outlet openings with different geometries (cf. FIGS. 6 to 7).

Figure 8:
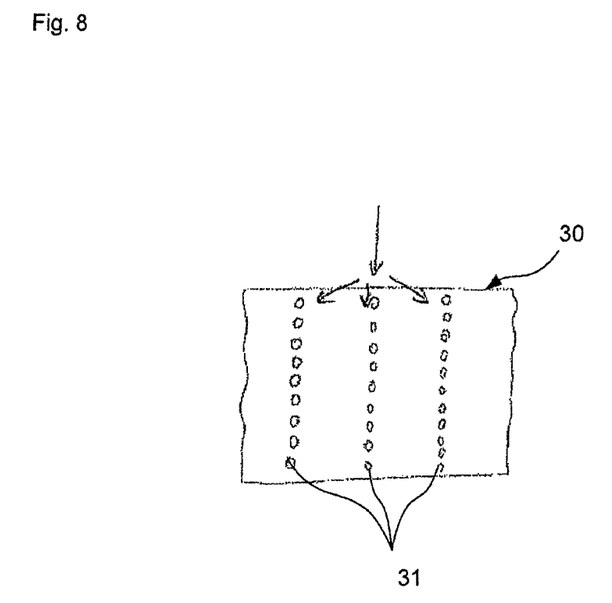
FIG. 8 illustrates the principle of single supply in a diverting device having a plurality of rows.
Figure 9:
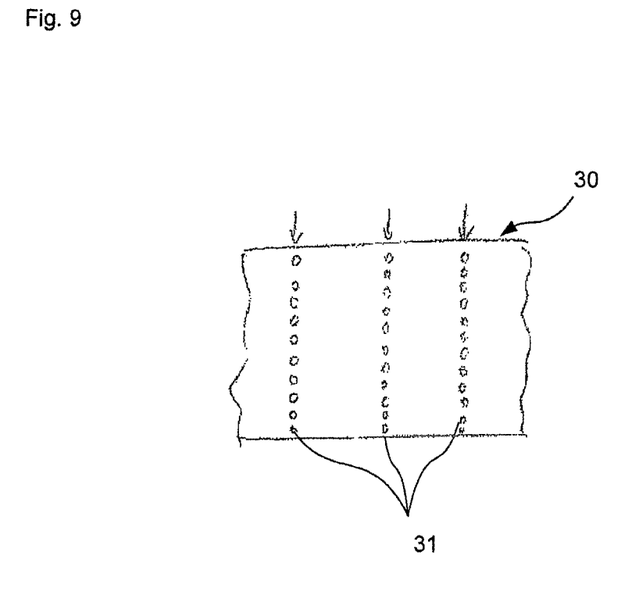
FIG. 9 illustrates the principle of multiple supply in a diverting device having a plurality of rows.

The outlet height of the power is limited according to the supplied height of the edge band K. Furthermore, the outlet openings 31 may be arranged in the direction of flow either in just one row or in a plurality of rows, depending on the requirements of the power levels of the processing machine. In combination with the power source or power sources, different constructions can be selected, in particular a power source for an outlet opening, a plurality of power sources per row of outlet openings or a combination thereof. With this construction a control in a chronologically different sequence is possible, and therefore the edge band can be activated in accordance with the flow movement (cf. FIGS. 8 and 9).

Figure 10A:
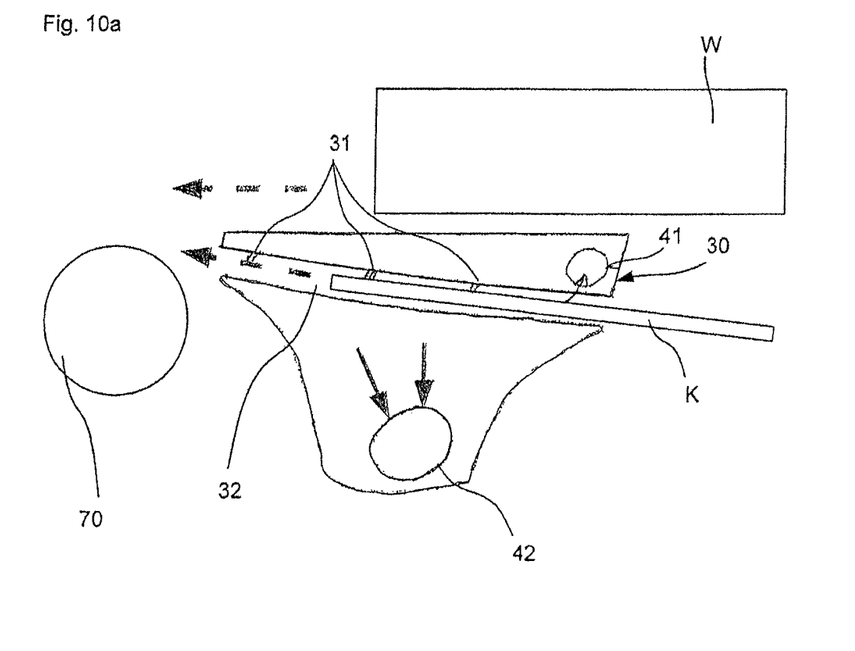
FIG. 10*a* illustrates an air return means provided in combination with the hot gas generation device.

In order to further increase the energy efficiency of the hot gas generation device 1, this can be combined with an air return means. Provision may also be made for outgoing hot air to be collected and guided back via a first suction device 41 to the diverting device 30. In addition to an arrangement in which the outgoing air is collected again directly at the diverting device 30, provision may be made for a second suction device 42 to be provided opposite the diverting device. The first and second suction devices 41 and 42 may be used individually or in combination with the respective other suction device.

It is clear from the plan view according to FIG. 10a how an edge band K is applied to a narrow side of a work piece W. In this respect the edge band K is conveyed in a guiding crack 32 which is formed adjacent to or in the diverting device 30. The rows of outlet openings 31 run perpendicular to the plane shown in FIG. 10. As explained above, depending on requirements one or more of the rows of outlet openings 31 may emit hot air which heats the edge band K or an adhesive layer applied thereon, thereby preparing it for being applied to the work piece W.

The work piece W and the edge band K are conveyed in coordination with one another and contact one another in the region of a pressure roller 70. The pressure roller 70 presses down the edge band K prepared for application to the work piece W onto said work piece W.

In place of the pressure roller 70, a plurality of pressure rollers or a different pressing device may also be provided in order to press the edge band K onto the work piece W.

FIG. 10a shows a section of a machine from the field of through-feed technology in which the work piece W is moved relative to the pressure roller. Alternatively, however, it is also possible for the pressure roller, the diverting device and, optionally, the housing to be provided such that they can move and for the work piece to be fixed during processing.

Figure 10B:
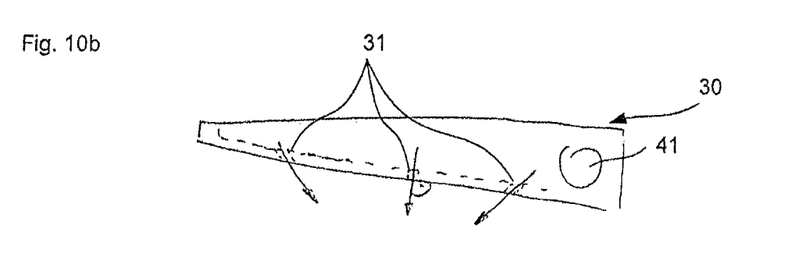
FIG. 10*b* shows outlet openings with various outlet angles.

FIG. 10b shows a detailed view of FIG. 10a. The diverting device shown comprises differently angled outlet openings 31, with one of the outlet openings opening out substantially vertically into the guiding crack 32, a further outlet opening being at an incline in the direction of conveyance of the edge band and the third outlet opening opening opposite the direction of conveyance of the edge band into the guiding crack.

The combination of differently angled outlet openings 31 shown in FIG. 10b is only exemplary. It is preferred that the one or optionally plural outlet openings open substantially vertically into the guiding crack 32.

Alternatively, the one or optionally plural outlet openings can be inclined in the direction or opposite the direction of conveyance of the edge band.

Figure 11:
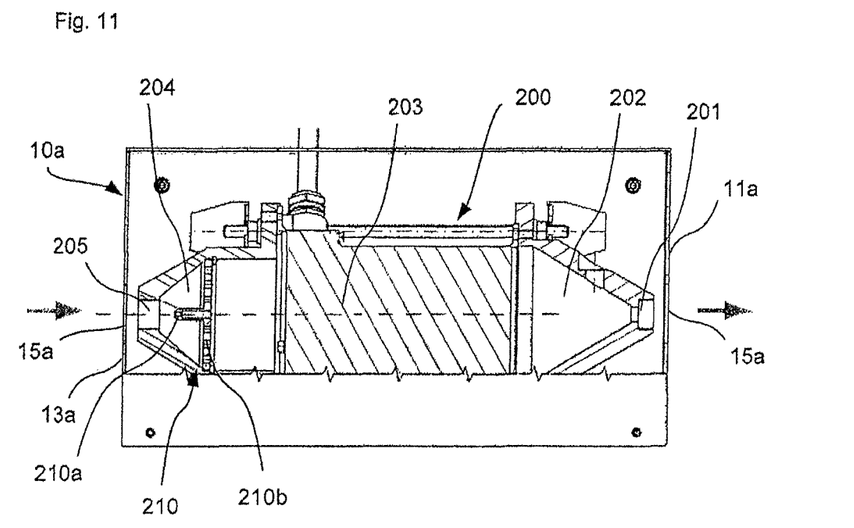
FIG. 11 shows a further embodiment of a hot gas generation device.
Figure 12:
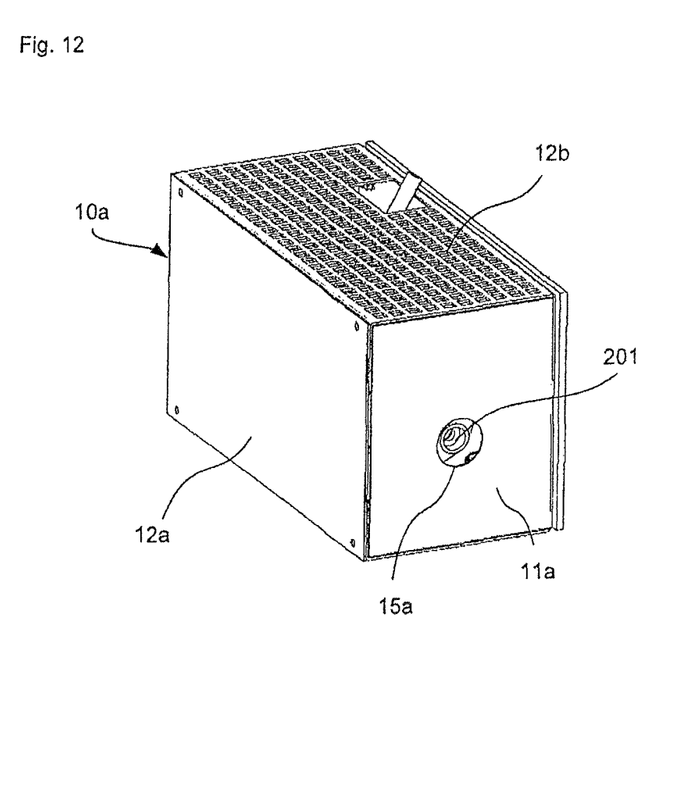
FIG. 12 is a perspective view of the hot gas generation device shown in FIG. 11.

In FIGS. 11 and 12 a further embodiment is shown. This comprises a housing 10a formed like the housing 10 in the first embodiment in a plurality of parts. Thus, the housing 10a comprises a base portion 11a, a plurality of side walls 12a and a cover portion 13a. In the region of the base portion 11a an inlet or outlet opening 15a is provided. Moreover, in the region of the cover portion 13a an inlet or outlet opening 15a is also provided.

With respect to the side walls 12a of the housing 10a, it must be noted that one of these is formed as a permeable cover 12b so that the elements provided inside the housing 10a can be examined from the outside without the housing 10a having to be opened.

A heating device 200 comprising a first opening 201 and a second opening 205 is provided inside the housing 10a, the openings 201, 205 being arranged so as to be flush with the respective inlet or outlet opening 15a.

Cone-shaped portions 202, 204 are arranged in the heating device 200 so as to be adjacent to the openings 201, 205.

If in FIG. 11 the air flows from the left-hand side through the first opening 205 into the heating device 200, the flow rate of the air is slowed down in the region of the first cone-shaped portion 204 and the air is distributed. For this a distribution unit 210 is provided in the region of the cone-shaped portion 204 or in the direction of flow following this. This distribution unit 210 comprises an impact portion 210a protruding toward the opening 205 and a separating element 210b having a plurality of openings, for example a punched sheet.

The air subsequently reaches the region of a heating portion 203 which is provided with ceramic heating elements. In this way, the air conveyed through the heating device 200 is heated in the heating portion 203. The flow rate of the heated air is then increased in the region of the second cone-shaped portion 202, and the heated air exits the heating device 200 in the region of the second opening 201, and therefore also exits the housing 10a.

The variant shown in FIGS. 11 and 12 is operated at increased air pressure, in particular in the range of >1 bar. This system also has a very small pressure loss in the region of the housing 10a and can therefore be operated at a relatively small inlet pressure, the flow rate required for the diverting device being able to be provided at the same time.

In particular, the variant of a hot gas generation device shown in FIGS. 11 and 12 is characterized by the following features: a heating device 200 having a first opening 205 and a cone-shaped portion 204 adjacent thereto for reducing the flow rate. In the direction of flow of the conveyed gas a heating portion 203 having ceramic heating elements is provided and subsequently a cone-shaped portion and a second opening 201. In particular, the heating device 200 is supplied with a gas having a pressure of >1 bar. Moreover, a distribution unit 210 can be provided in the region of the cone-shaped portion 204 or in the direction of flow following this. This distribution unit 210 preferably comprises an impact portion 210a protruding toward the opening 205 and a separation element 210b having a plurality of openings, for example a punched sheet.

It is possible to provide the hot gas generation device according to FIGS. 11 and 12 with features which are mentioned in connection with the first embodiment. Moreover, the hot gas generation device according to FIGS. 11 and 12 can be provided with a diverting device 30 as described above.

A plurality of hot gas generation devices as shown in FIGS. 11 and 12 can be arranged in series or in parallel in order to supply the heated gas to a diverting device. Moreover, it is possible to combine the hot gas generation devices according to the described embodiments in series or in parallel.

The invention claimed is:

1. A hot gas generation device for generating and providing hot gas, in particular hot air, for a work piece coating machine, in particular an edge gluing machine, comprising:
   a housing, a gas conveyance path guided within the housing and a power source for heating a gas conveyed in the gas conveyance path,
   characterized in that
   the gas conveyance path runs in the housing about an axis in a manner selected from the group consisting of a coil-shaped, spiral-shaped and helix-shaped with the same or a changing pitch.

2. The hot gas generation device according to claim 1, characterized in that the power source is accommodated inside the housing.

3. The hot gas generation device according to claim 1, characterized in that the power source is selected from the group consisting of a resistance heater cartridge, an IR emitter and an inductive power source.

4. The hot gas generation device according to claim 1, wherein the housing comprises a plurality of housings connected in parallel or in series.

5. The hot gas generation device according to claim 1, further comprising a diverting device having at least one outlet opening provided in a direction of flow after the housing.

6. The hot gas generation device according to claim 5, characterized in that cross sections of the outlet opening have a shape which is selected from the group consisting of round, elliptical, square, slit-shaped, and in the shape of a free form.

7. The hot gas generation device according to claim 5, characterized in that a plurality of rows of outlet openings is provided on the diverting device, which are all connected to the gas conveyance path.

8. The hot gas generation device according to claim 5, characterized in that the diverting device further comprises a first suction device adjacent to the outlet opening.

9. The hot gas generation device according to claim 8, characterized in that a second suction device is provided substantially opposite the outlet opening.

10. The hot gas generation device according to claim 5, characterized in that the outlet opening exits perpendicular to or at an incline from the diverting device.

11. A work piece coating machine, in particular an edge gluing machine, having the hot gas generation device according to claim 1.

12. The hot gas generation device according to claim 5, characterized in that a plurality of rows of outlet openings is provided on the diverting device, wherein one gas conveyance path is provided for each row of outlet openings.

13. The hot gas generation device according to claim 7, characterized in that the diverting device further comprises a first suction device adjacent to the outlet opening.

14. The hot gas generation device of claim 1 wherein a cross section of the gas generation path is constant or increases along a direction of flow.

15. A hot gas generation device for generating and providing hot gas, in particular hot air, for a work piece coating machine, in particular an edge gluing machine, comprising:
   a housing, a gas conveyance path guided within the housing and a power source for heating a gas conveyed in the gas conveyance path, and
   further comprising a rotational body accommodated in the housing on an outer side of which the gas conveyance path runs,
   wherein the rotational body is accommodated in an insulation pipe,
   characterized in that the gas conveyance path runs in the housing about an axis.

16. The hot gas generation device according to claim 15, characterized in that the power source is accommodated inside the housing.

17. The hot gas generation device according to claim 15, characterized in that the power source is selected from the group consisting of a resistance heater cartridge, an IR emitter and an inductive power source.

18. The hot gas generation device according to claim 15, wherein the housing comprises a plurality of housings connected in parallel or in series and further comprising a diverting device having at least one outlet opening provided in a direction of flow after the housing.

19. The hot gas generation device according to claim 18, characterized in that a plurality of rows of outlet openings is provided on the diverting device, which are all connected to the gas conveyance path.

20. The hot gas generation device according to claim 18, characterized in that the diverting device further comprises a first suction device adjacent to the outlet opening.

21. The hot gas generation device according to claim 18, characterized in that a second suction device is provided substantially opposite the outlet opening.

22. The hot gas generation device according to claim 18, characterized in that the outlet opening exits perpendicular to or at an incline from the diverting device.

23. A work piece coating machine, in particular an edge gluing machine, having the hot gas generation device according to claim 15.

24. The hot gas generation device of claim 15 wherein the rotational body is accommodated in the insulation pipe.

25. The hot gas generation device of claim 15 wherein a cross section of the gas generation path is constant or increases along a direction of flow.

26. A hot gas generation device for generating and providing hot gas, in particular hot air, for a work piece coating machine, in particular an edge gluing machine, comprising:
   a housing, a gas conveyance path guided within the housing and a power source for heating a gas conveyed in the gas conveyance path, and
   further comprising a rotational body accommodated in the housing,
   characterized in that
   the gas conveyance path runs in the housing about an axis and is guided inside the rotational body.

27. The hot gas generation device according to claim 26, characterized in that the power source is selected from the group consisting of a resistance heater cartridge, an IR emitter and an inductive power source.

28. The hot gas generation device according to claim 26, wherein the housing comprises a plurality of housings connected in parallel or in series.

29. A work piece coating machine, in particular an edge gluing machine, having the hot gas generation device according to claim 26.

30. The hot gas generation device according to claim 26, characterized in that the power source is accommodated in the rotational body.

31. The hot gas generation device of claim 26 wherein a cross section of the gas generation path is constant or increases along a direction of flow.

* * * * *